US012744193B2

(12) United States Patent
Rubenstein et al.

(10) Patent No.: US 12,744,193 B2
(45) Date of Patent: Sep. 22, 2026

(54) METHOD OF IMPROVING A MASS SPECTROMETER, MODULE FOR IMPROVING A MASS SPECTROMETER AND AN IMPROVED MASS SPECTROMETER

(71) Applicant: Government of the United States, as represented by the Secretary of the Air Force, Wright-Patterson AFB, OH (US)

(72) Inventors: Mitchell H Rubenstein, Beavercreek, OH (US); Christin M Duran, Dayton, OH (US); John T Kelly, Xenia, OH (US); Jae Hwan Lee, Watervliet, NY (US); Sarah Pfahler, Miamisburg, OH (US); Robert M Bradford, Dayton, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 384 days.

(21) Appl. No.: 18/224,612

(22) Filed: Jul. 21, 2023

(65) Prior Publication Data

US 2024/0071738 A1 Feb. 29, 2024

Related U.S. Application Data

(60) Provisional application No. 63/450,475, filed on Mar. 7, 2023, provisional application No. 63/402,191, filed on Aug. 30, 2022.

(51) Int. Cl.
*H01J 49/00* (2006.01)

(52) U.S. Cl.
CPC ................................ *H01J 49/0036* (2013.01)

(58) Field of Classification Search
CPC .................................................. H01J 49/0036
USPC ............................................................ 702/3
See application file for complete search history.

(56) References Cited

U.S. PATENT DOCUMENTS

| | | | | |
|---|---|---|---|---|
| 2021/0098241 | A1* | 4/2021 | Kuehl | G01N 30/8675 |
| 2023/0194415 | A1* | 6/2023 | Reimann | G06F 17/16 250/252.1 |
| 2023/0282311 | A1* | 9/2023 | Behsaz | G16B 40/10 702/27 |
| 2024/0347141 | A1* | 10/2024 | Duchoslav | G16C 20/70 |
| 2024/0404653 | A1* | 12/2024 | Jones | G06N 20/10 |

* cited by examiner

*Primary Examiner* — Ricky Go

(74) *Attorney, Agent, or Firm* — AFMCLO/JAZ; Richard M. Mescher

(57) ABSTRACT

The present invention relates to a method of improving a mass spectrometer, a module for improving a mass spectrometer and an improved mass spectrometer. The aforementioned method uses machine learning and can greatly reduce the number and timeframe for the elimination of false positives to a couple of hours. Such method can be integrated into a mass spectrometer by inserting a computer module programmed with such method into a mass spectrometer's computer system.

16 Claims, 5 Drawing Sheets

METHOD OF IMPROVING A MASS SPECTROMETER, MODULE FOR IMPROVING A MASS SPECTROMETER AND AN IMPROVED MASS SPECTROMETER

CROSS-REFERENCE TO RELATED APPLICATION

The present application claims priority to U.S. Provisional Application Ser. No. 63/450,475 filed Mar. 7, 2023, and U.S. Provisional Application Ser. No. 63/402,191 filed Aug. 30, 2022, the contents of both such priority documents being hereby incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to a method of improving a mass spectrometer, a module for improving a mass spectrometer and an improved mass spectrometer.

BACKGROUND OF THE INVENTION

Current mass spectrometers are used to determine the mass of an analyte in a sample. Currently, Tentatively Identified Compounds (TICs) are generated by commercial software generally purchased with mass spectrometers. This includes mass spectral matching software from National Institute of Standards and Technology (NIST), Automated Mass Spectral Deconvolution and Identification System (AMDIS) or/and others. However, the selection of matches is based solely on library match and results in numerous false positives. After the NIST/AMDIS search is conducted the TICs are manually inspected resulting in considerable effort in days/weeks, etc. and may be influenced by human error.

Applicants, disclose herein a method of improving a mass spectrometer, a module for improving a mass spectrometer and an improved mass spectrometer that alleviate the majority of human evaluation of the matches. The disclosed method can reduce the timeframe for the elimination of false positives to a couple of hours.

SUMMARY OF THE INVENTION

The present invention relates to a method of improving a mass spectrometer, a module for improving a mass spectrometer and an improved mass spectrometer. The aforementioned method uses machine learning and can greatly reduce the number and timeframe for the elimination of false positives to a couple of hours. Such method can be integrated into a mass spectrometer by inserting a computer module programmed with such method into a mass spectrometer's computer system.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

As used herein, the words "about," "approximately," or the like, when accompanying a numerical value, are to be construed as indicating a deviation as would be appreciated by one of ordinary skill in the art to operate satisfactorily for an intended purpose.

As used herein, the words "and/or" means, when referring to embodiments (for example an embodiment having elements A and/or B) that the embodiment may have element A alone, element B alone, or elements A and B taken together.

As used herein, a chromatographically compatible chemical is a chemical that elutes during an analytical run from a chromatography column that is chosen for an analytical system.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Method, Correction Module and Improved Mass Spectrometer

Figure 1A:
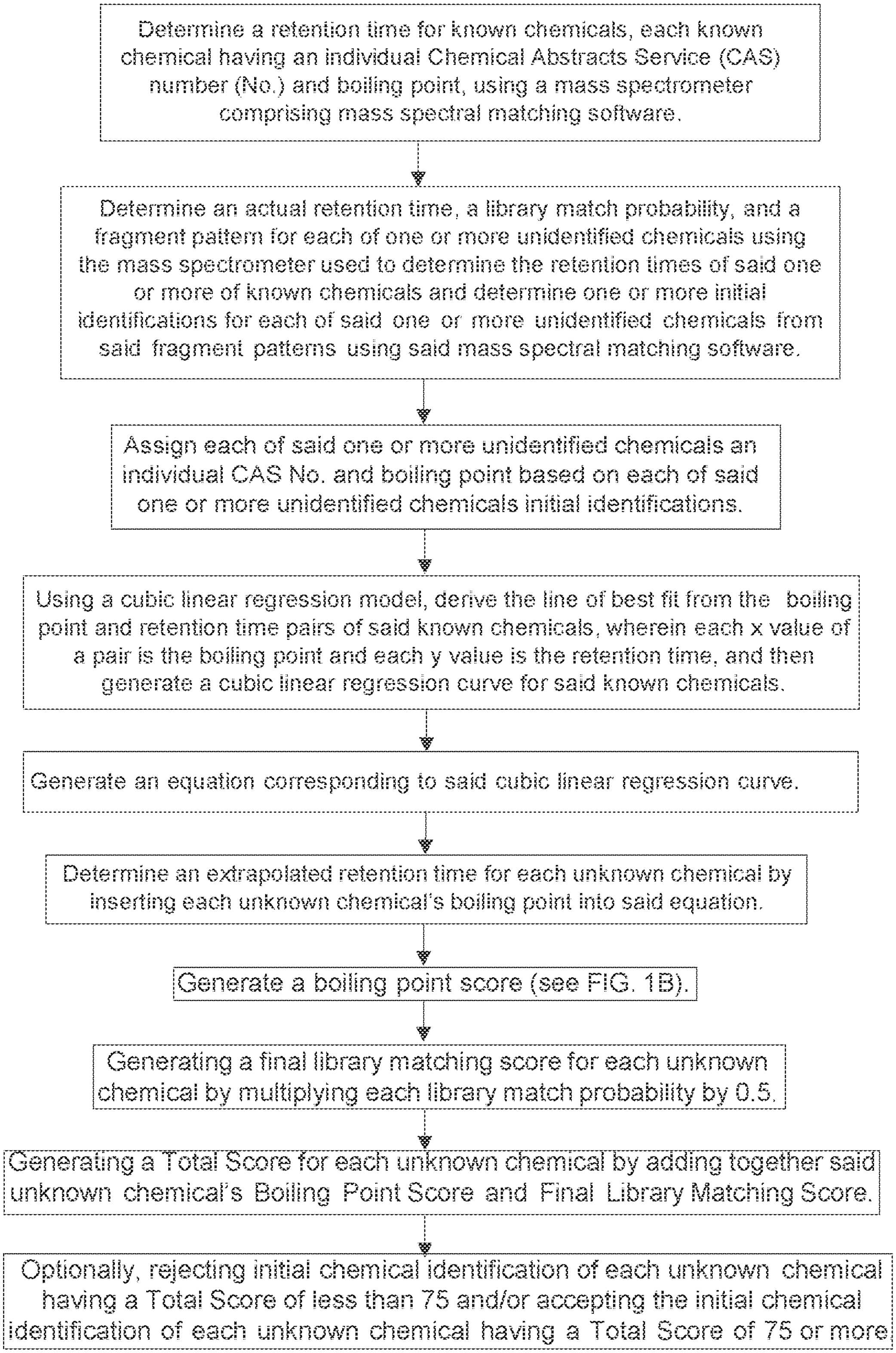
FIG. 1A is a flow diagram of a method of determining the accuracy of an initial chemical identification obtained from mass spectral matching software.
Figure 1B:
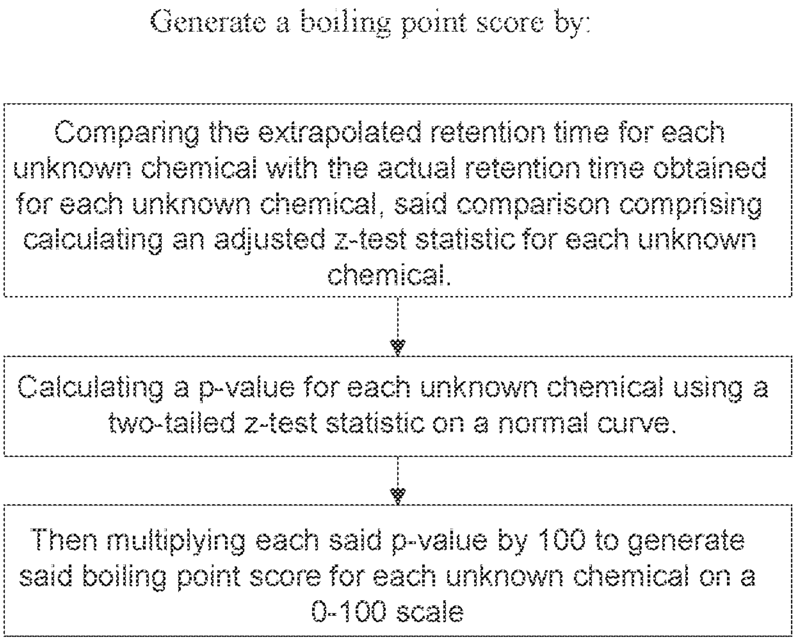
FIG. 1B is a flow diagram of a method of determining a boiling point score for the method of FIG. 1A.

For purposes of this specification, headings are not considered paragraphs. In this paragraph and FIGS. 1A and 1B, Applicants disclose a method of determining the accuracy of an initial chemical identification obtained from mass spectral matching software:

a) determine a retention time for each of 10 or more known chemicals, preferably determine a retention time for each of 20 or more known chemicals, more preferably determine a retention time for each of 40 or more known chemicals, most preferably determine a retention time for each of 68 or more known chemicals, each known chemical having an individual Chemical Abstracts Service (CAS) number (No.) and boiling point, using a mass spectrometer comprising mass spectral matching software, preferably said mass spectral matching software is NIST mass spectral matching software, and/or AMDIS mass spectral matching software, preferably said known chemicals are selected from the group consisting of chromatographically compatible chemicals, preferably said known chemicals are selected from the group consisting of Dichlorodifluoromethane; Chloromethane; 1,2 dichlorotetrafluoroethane; Vinyl chloride; 1,3-Butadiene; Bromomethane; Chloroethane; Trichlorofluoromethane; Acetone; 2-propanol; 1,1-Dichloroethene; Acrylonitrile; 1,1,2-trichloro-1,2,2-trifluoroethane; Methylene Chloride; Carbon disulfide; trans-1,2-Dichloroethene; Methyl tert butyl ether; 1,1-Dichloroethane; Vinyl acetate; 2-Butanone; Hexane; Bromochloromethane; Tetrahydrofuran; cis-1,2-Dichloroethene; 2,2-Dichloropropane; Chloroform; 1,1,1-Trichloroethane; 1,2-Dichloroethane; 1,1-Dichloropropene; Cyclohexane; Benzene; Carbon tetrachloride; 2,2,4-Trimethylpentane; n-Heptane; 1,2-Dichloropropane; 1,4 Dioxane; Trichloroethene; Bromodichloromethane; Methyl-2-pentanone; cis-1,3-Dichloropropene; Toluene; trans-1,3-Dichloropropene; 1,1,2-Trichloroethane; 2-Hexanone; 1,3-Dichloropropane; Dibromochloromethane; 1,2-Dibromoethane; Tetrachloroethene; Chlorobenzene; Ethylbenzene; m,p-Xylene; Styrene; Bromoform; o-Xylene; 1,1,2,2-Tetrachloroethane; 1,2,3-Trichloropropane; n-Propyl benzene; Isopropyl benzene; 4-Ethyltoluene; 1,3,5-Trimethylbenzene; 1,2,4-Trimethylbenzene; 1,3-Dichlorobenzene; Benzyl chloride; 1,4-Dichlorobenzene; 1,2-Dichlorobenzene; 1,2,4-Trichlorobenzene; Hexachlorobutadiene; 1,1-Difluoroethane; Acenaphthene; Acenaphthylene; Anthracene; Azobenzene; Benz[a]anthracene; Benzo[b]fluoranthene; Benzo[k]fluoranthene; Benzo[ghi]perylene; Benzo[a]pyrene; Benzyl butyl phthalate; Bis(2-chloroethoxy) methane; Bis(2-chloroethyl) ether; Bis(2-ethylhexyl) phthalate; 4-Bromodiphenyl ether; Carbazole, 4-Chloroaniline; 4-Chlorodiphenyl ether; Bis-(2-chlorisopropyl) ether; 4-Chloro-3-methylphenol; 2-Chloronaphthalene; 2-Chlorophenol; Chrysene, p-Cresol; Dibenz[a,h]anthracene; Dibenzofuran; Dibutyl phthalate; 1,2-Dichlorobenzene; 1,3-Dichlorobenzene; 1,4-Dichlorobenzene; 2,4-Dichlorophenol; Diethyl phthalate; 2,4-Dimethylphenol; Dimethyl phthalate; 2,4-Dinitrophenol; 2,4-Dinitrotoluene; 2,6-Dinitrotoluene; Di-n-octyl phthalate; Fluoranthene; Fluorene; Hexachlorobenzene; Hexachloro-1,3-butadiene; Hexachlorocyclopentadiene; Hexachloroethane; Indeno[1,2,3-cd]pyrene; Isophorone; 2-Methyl-4,6-dinitrophenol; 2-Methylnaphthalene; o-Cresol, Naphthalene; 2-Nitroaniline; 3-Nitroaniline; 4-Nitroaniline; Nitrobenzene; 2-Nitrophenol, 4-Nitrophenol; N-Nitrosodimethylamine; N-Nitrosodi-n-propylamine; Pentachlorophenol; Phenanthrene; Phenol; Pyrene; 1,2,4-Trichlorobenzene; 2,4,5-Trichlorophenol; 2,4,6-Trichlorophenol and mixtures thereof; in one aspect, said known chemicals are selected from the group consisting of Bromomethane; Chloroethane; Acetone; 2-propanol; 1,1-Dichloroethene; Acrylonitrile; Methylene Chloride; Carbon disulfide; trans-1,2-Dichloroethene; Methyl tert butyl ether; 1,1-Dichloroethane; Vinyl acetate; 2-Butanone; Bromochloromethane; Tetrahydrofuran; cis-1,2-Dichloroethene; Chloroform; 1,1,1-Trichloroethane; 1,2-Dichloroethane; 1,1-Dichloropropene; Benzene; Carbon tetrachloride; 2,2,4-Trimethylpentane; 1,2-Dichloropropane; 1,4 Dioxane; Trichloroethene; Bromodichloromethane; Methyl-2-pentanone; cis-1,3-Dichloropropene; Toluene; trans-1,3-Dichloropropene; 1,1,2-Trichloroethane; 2-Hexanone; 1,3-Dichloropropane; Dibromochloromethane; 1,2-Dibromoethane; Tetrachloroethene; Chlorobenzene; Ethylbenzene; m,p-Xylene; Bromoform; o-Xylene; 1,1,2,2-Tetrachloroethane; 1,2,3-Trichloropropane; n-Propyl benzene; Isopropyl benzene; 4-Ethyltoluene; 1,3,5-Trimethylbenzene; 1,2,4-Trimethylbenzene; 1,3-Dichlorobenzene; 1,4-Dichlorobenzene; 1,2-Dichlorobenzene; 1,2,4-Trichlorobenzene; Hexachlorobutadiene and mixtures thereof;

b) determine an actual retention time, a library match probability and a fragment pattern for each of one or more unidentified chemicals using the mass spectrometer used to determine the retention times of said one or more of known chemicals and determine one or more initial identifications for each of said one or more unidentified chemicals from said fragment patterns using said mass spectral matching software;

c) assign each of said one or more unidentified chemicals an individual CAS No. and boiling point based on each of said one or more unidentified chemicals initial identifications;

d) using a cubic linear regression model, derive the line of best fit from the boiling point and retention time pairs of said known chemicals wherein each x value of a pair is the boiling point and each y value is the retention time and then generate a cubic linear regression curve for said known chemicals;

e) generate an equation corresponding to said cubic linear regression curve;

f) determine an extrapolated retention time for each unknown chemical by inserting each unknown chemical's boiling point into said equation;

g) generate a boiling point score by:

(i) comparing the extrapolated retention time for each unknown chemical with the actual retention time obtained for each unknown chemical, said comparison comprising calculating an adjusted z-test statistic for each unknown chemical;

(ii) calculating a p-value for each unknown chemical using a two-tailed z-test statistic on a normal curve;

(iii) then multiplying each said p-value by 100 to generate said boiling point score for each unknown chemical on a 0-100 scale; and h) generate a final library matching score for each unknown chemical by multiplying each library match probability by 0.5;

i) generate a Total Score for each unknown chemical by adding together said unknown chemical's Boiling Point Score and Final Library Matching Score; and j) optionally, reject the initial chemical identification of each unknown chemical having a Total Score of less than 75 and/or accepting the initial chemical identification of each unknown chemical having a Total Score of 75 or greater. It should be noted that the acceptance criteria can be set by the user.

Any recent versions of the aforementioned NIST and AMDIS are acceptable. For example, the NIST mass spectral matching software NIST 2017 v.20, software version 2,4 and AMDIS mass spectral matching software v2.7 is acceptable and is available at no cost and be downloaded via internet (https://amdis.software.informer.com/2.7/). Such software can also be added as a as a line item on equipment such as a Thermo-Fisher gas chromatograph mass spectrometer. Suitable chemicals can be obtained from, for example, Restek Pure Chromatography of Bellefonte, PA USA.

Applicants disclose a method according to the previous paragraph comprising:

a) running one or more replicates for each unknown chemical and generating a Final Replicates Score for each unknown chemical, said Final Replicates Score generation for each unknown chemical comprising:
   (i) running one or more replicates of each sample comprising said one or more unknown chemicals;
   (ii) determining, for each unknown chemical, a number of times each unknown chemical is initially identified based on the total number of said replicates
   (iii) dividing the number of times each unknown chemical is initially identified based on the total number of said replicates by the total number of replicates to obtain an Initial Replicates Score for each unknown chemical; and
   (iv) multiplying each unknown chemical's Initial Replicates Score by 50 to obtain a Final Replicates Score for each unknown chemical b) generating a Total Score for each unknown chemical by adding together said unknown chemical's Boiling Point Score, Final Library Matching Score and Final Replicates Score c) optionally, rejecting the initial chemical identification of each unknown chemical having a Total Score of less than 100 and/or accepting the initial chemical identification of each unknown chemical having a Total Score of 100 or greater.

Figure 2A:
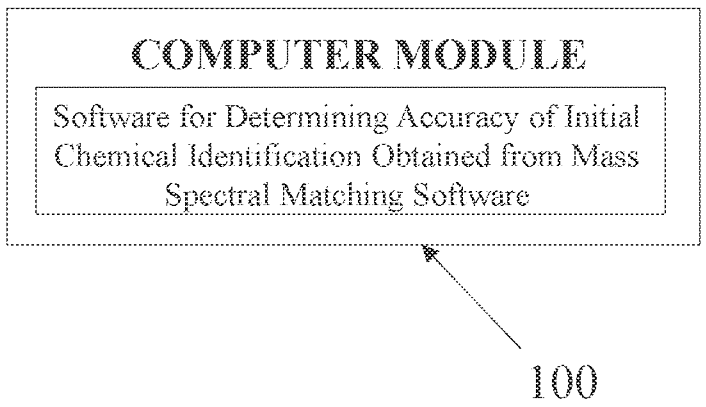
FIG. 2A is a bock diagram of a computer module according to the present invention.

In FIG. 2A. Applicants disclose a computer module 100 programmed with the method of one of the previous two paragraphs.

Applicants disclose the computer module of the previous paragraph said computer module comprising an input/output controller, a random access memory unit, a hard drive memory unit, and a unifying computer bus system, said input/output controller being configured to receive a digital signal and transmit said signal to said central processing unit and retrieve a signal comprising the accurate measurand from said central processing unit.

Figure 2B:
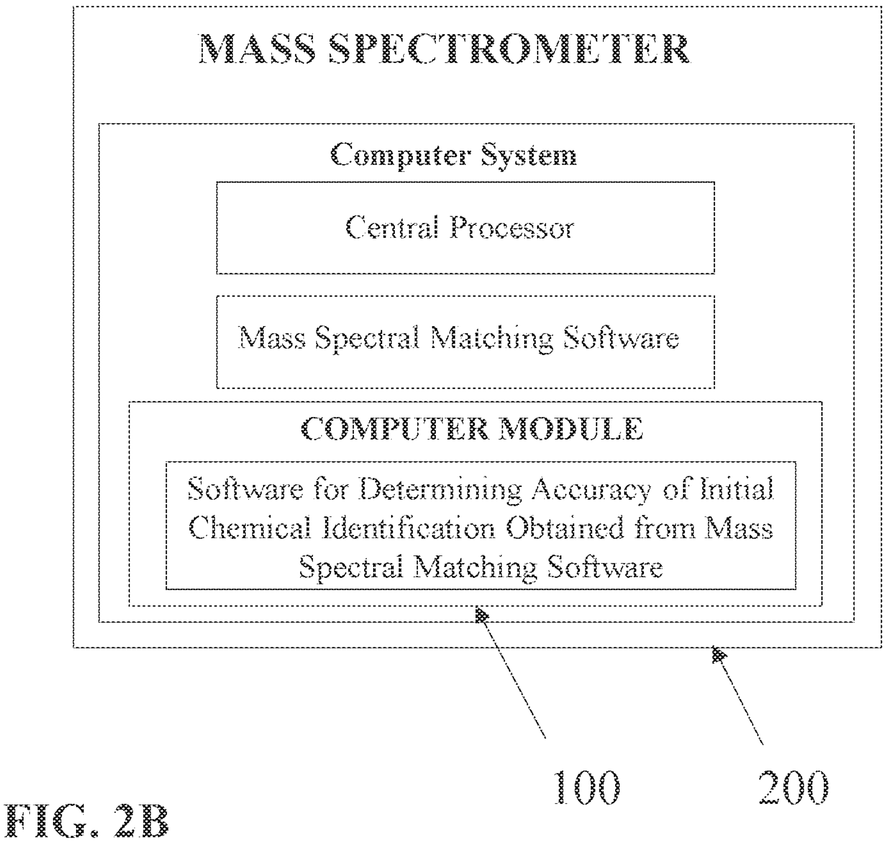
FIG. 2B is a bock diagram of a mass spectrometer comprising a computer module according to the present invention.

In FIG. 2B. Applicants disclose a mass spectrometer 200 comprising a computer module 100 according to the previous paragraph, in one aspect, said computer module comprises an input/output controller, a random access memory unit, a hard drive memory unit, and a unifying computer bus system, said input/output controller being configured to receive a digital signal and transmit said signal to said central processing unit and retrieve a signal comprising the accurate measurand from said central processing unit.

Figure 2C:
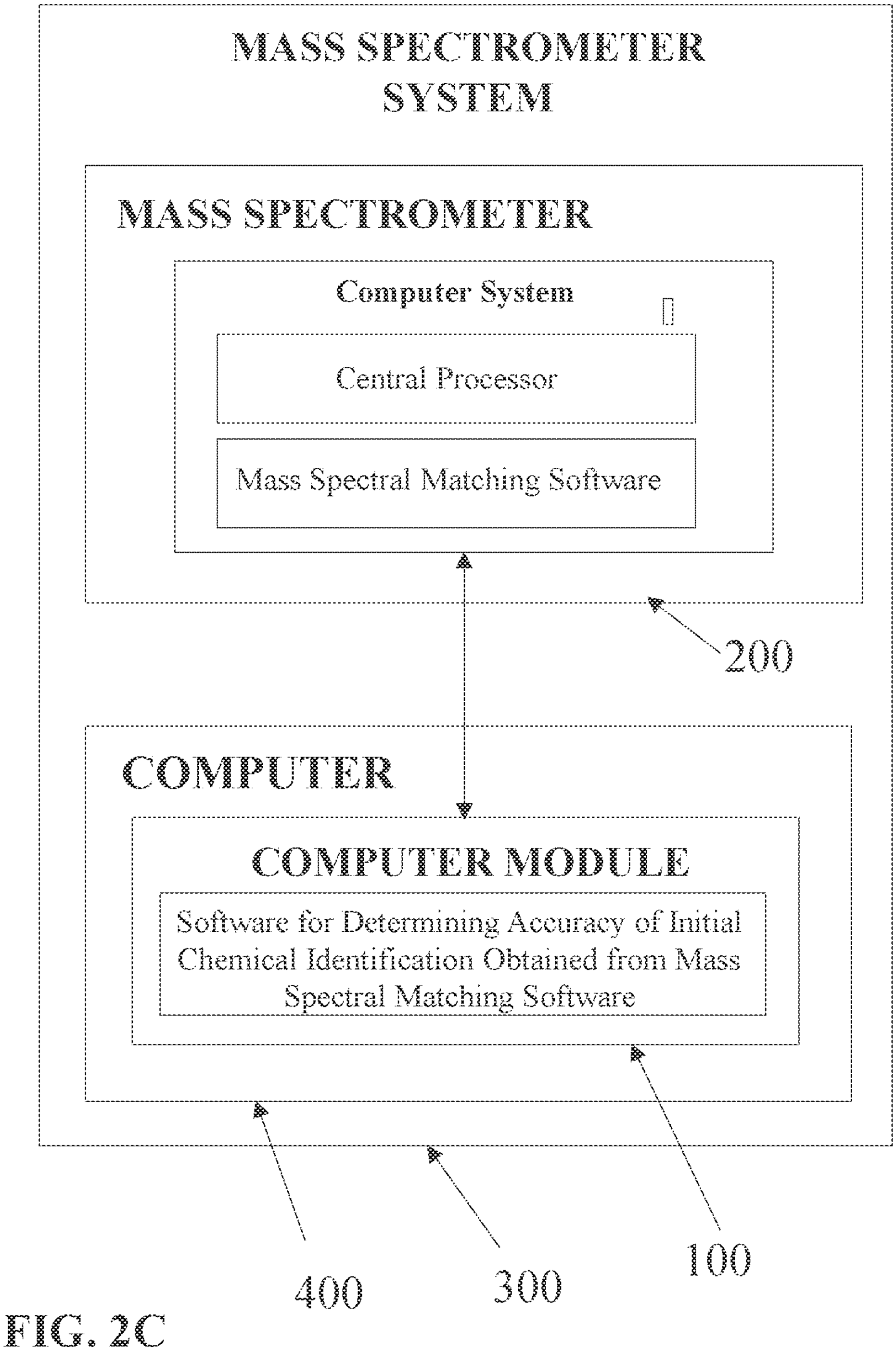
FIG. 2C is a bock diagram of a mass spectrometer system comprising a mass spectrometer and a separate computer including a computer module according to the present invention.

In FIG. 2C, Applicants disclose a mass spectrometer system 300 comprising a mass spectrometer 200 and a computer 400, said computer 400 comprising a computer module 100 according to the third or fourth paragraphs of the section of this specification titled "Method, Correction Module and Improved Mass Spectrometer", said computer 400 not being physically part of said mass spectrometer 200, but being in communication with said mass spectrometer 200. In one aspect, said computer module comprises an input/output controller, a random access memory unit, a hard drive memory unit, and a unifying computer bus system, said input/output controller being configured to receive a digital signal and transmit said signal to said central processing unit and retrieve a signal comprising the accurate measurand from said central processing unit.

Figure 2D:
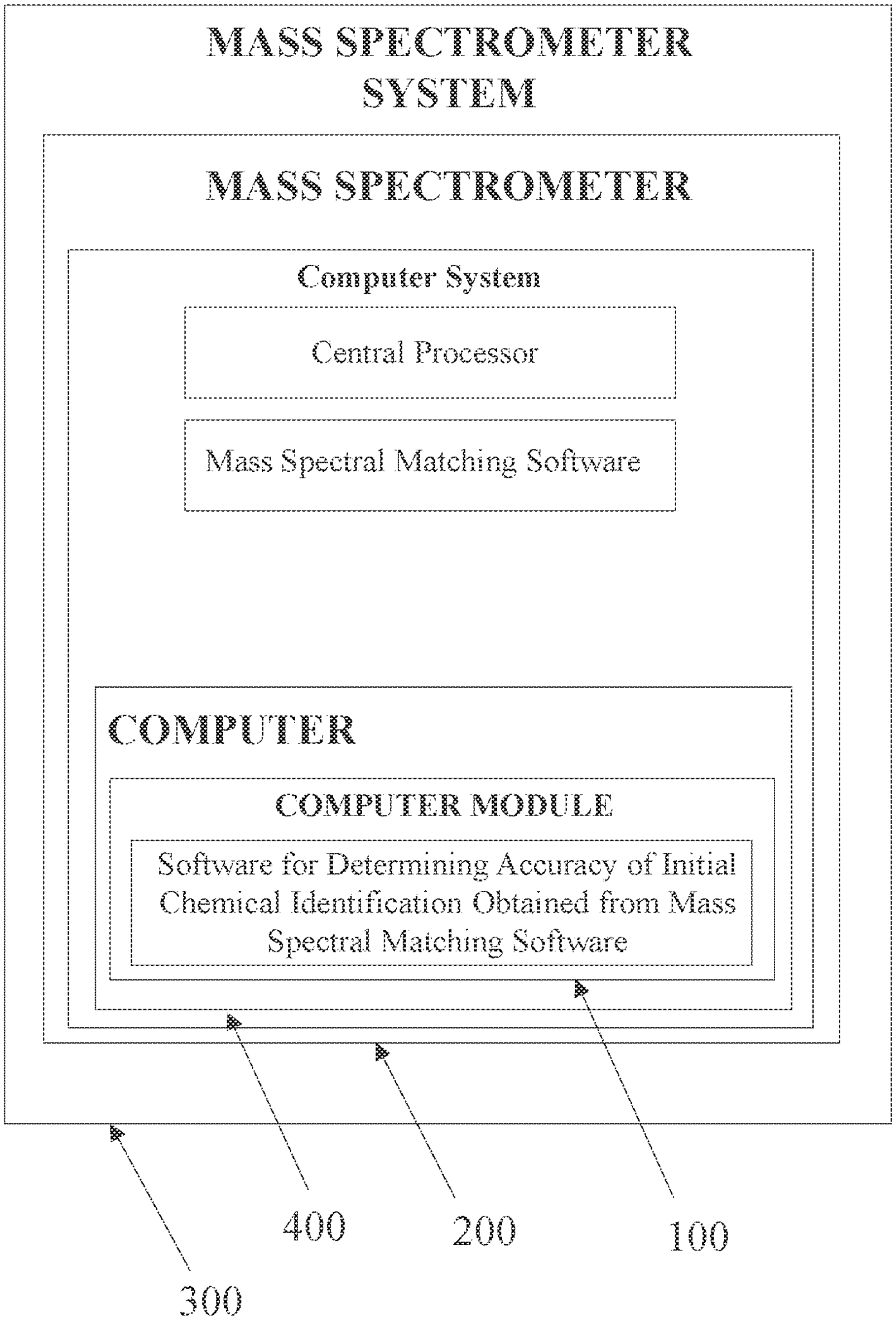
FIG. 2D is a bock diagram of mass spectrometer system comprising a mass spectrometer having an integrated computer with a computer module according to the present invention.

In FIG. 2D, Applicants disclose a mass spectrometer system 300 comprising a mass spectrometer 200 and a computer 400, said computer 400 comprising a computer module 100 according to third or fourth paragraphs of the section of this specification titled "Method, Correction Module and Improved Mass Spectrometer", said computer 400 being physically part of said mass spectrometer 200 and being in communication with said mass spectrometer 200. In one aspect, said computer module comprises an input/output controller, a random access memory unit, a hard drive memory unit, and a unifying computer bus system, said input/output controller being configured to receive a digital signal and transmit said signal to said central processing unit and retrieve a signal comprising the accurate measurand from said central processing unit.

Detailed Mathematics of Method

The mathematical details of Applicants' method are as follows:

a.) Assigning a Boiling Point Score ($Score_{BP}$) based on the boiling points (BPs) and retention times (RTs) of the TICs. The score is computed by first using the BPs and RTs of the known calibration compounds to generate a cubic linear regression curve ($y=a+bx+cx^2+dx^3$) where x is the BP and a, b, c, and d are constants that are computer generated by the computer generating the cubic linear regression curve when the computer is generating such cubic linear regression curve. The BPs of the TICs (scraped from the internet by the software) are entered into the curve to obtain predicted retention times, which are then entered into the following equation to calculate an adjusted z-test statistic $$\frac{\left(\frac{|p-o|}{\sqrt{\frac{\sum(p_i-o_i)^2}{n-k}}}\right)}{1.75},$$

wherein
k=number of model parameters
n=number of data points
p=predicted retention time
o=observed retention time
i=ith compound This adjust z-test statistic is then used to calculate the p-value based on the two-tailed z-test statistic on a normal curve, which is then multiplied by 100 to provide a score on a 0-100 scale.

b.) Assigning a Library Matching Score ($Score_{LIB}$) based on the library match probability provided by the mass spectrometry software using the following equation, 1*0.5, wherein l=library match probability provided by mass spectrometry software c.) Assigning a Replicates Score ($Score_{REP}$) based on the replicates present, if the study contained replicates, using the following equation $$\left(\frac{m}{r}\right)*50,$$

wherein m=number of samples containing TIC r=number of replicate samples d.) Assigning a Total Score ($Score_{TOTAL}$) by adding together the $Score_{BP}$, $Score_{LIB}$, and $Score_{REP}$.

For oxygenated TICs (TICs that contain oxygen can be obtained by scraping the internet and obtaining molecular formulae using the CAS #obtained from contributed software (i.e. NIST, EPA CompTox, etc.)), the total score can be improved by using the following mathematical details of Applicants' method:

a.) Assigning a Boiling Point Score ($Score_{BP}$) based on the boiling points (BPs) and retention times (RTs) of the oxygenated TICs. The score is computed by first using the BPs and RTs of oxygenated TICs and the known oxygenated calibration compounds to generate a cubic linear regression curve ($y=a+bx+cx^2+dx^3$) where x is the BP and a, b, c, and d are constants that are computer generated by the computer generating the cubic linear regression curve when the computer is generating such cubic linear regression curve. The BPs of the oxygenated TICs (scraped from the internet by the software) are entered into the curve to obtain predicted retention times, which are then entered into the following equation to calculate an adjusted z-test statistic $$\frac{\left(\frac{|p-o|}{\sqrt{\frac{\sum(p_i-o_i)^2}{n-k}}}\right)}{1.75},$$

wherein k=number of model parameters n=number of data points p=predicted retention time o=observed retention time i=ith compound This adjust z-test statistic is then used to calculate the p-value based on the two-tailed z-test statistic on a normal curve, which is then multiplied by 100 to provide a score on a 0-100 scale.

e.) Assigning a Library Matching Score ($Score_{LIB}$) based on the library match probability provided by the mass spectrometry software using the following equation, l*0.5, wherein l=library match probability provided by mass spectrometry software f.) Assigning a Replicates Score ($Score_{REP}$) based on the replicates present, if the study contained replicates, using the following equation, $$\left(\frac{m}{r}\right)*50,$$

wherein m=number of samples containing oxygenated TIC r=number of replicate samples g.) Assigning a Total Score ($Score_{TOTAL}$) by adding together the $Score_{BP}$, $Score_{LIB}$, and $Score_{REP}$.

For halogenated TICs (TICs that contain one or more halogens can be obtained by scraping the internet and obtaining molecular formulae using the CAS #obtained from contributed software (i.e. NIST, EPA CompTox, etc.)), the total score can be improved by using the following mathematical details of Applicants' method:

a.) Assigning a Boiling Point Score ($Score_{BP}$) based on the boiling points (BPs) and retention times (RTs) of the halogenated TICs. The score is computed by first using the BPs and RTs of the halogenated TICs and the known halogenated calibration compounds to generate a cubic linear regression curve ($y=a+bx+cx^2+dx^3$) where x is the BP and a, b, c, and d are constants that are computer generated by the computer generating the cubic linear regression curve when the computer is generating such cubic linear regression curve. The BPs of the halogenated TICs (scraped from the internet by the software) are entered into the curve to obtain predicted retention times, which are then entered into the following equation to calculate an adjusted z-test statistic, $$\frac{\left(\frac{|p-o|}{\sqrt{\frac{\sum(p_i-o_i)^2}{n-k}}}\right)}{1.75},$$

wherein k=number of model parameters n=number of data points p=predicted retention time o=observed retention time i=ith compound This adjust z-test statistic is then used to calculate the p-value based on the two-tailed z-test statistic on a normal curve, which is then multiplied by 100 to provide a score on a 0-100 scale.

h.) Assigning a Library Matching Score ($Score_{LIB}$) based on the library match probability provided by the mass spectrometry software using the following equation, l*0.5, wherein l=library match probability provided by mass spectrometry software i.) Assigning a Replicates Score ($Score_{REP}$) based on the replicates present, if the study contained replicates, using the following equation, $$\left(\frac{m}{r}\right)*50,$$

wherein m=number of samples containing halogenated TIC r=number of replicate samples j.) Assigning a Total Score ($Score_{TOTAL}$) by adding together the $Score_{BP}$, $Score_{LIB}$, and $Score_{REP}$.

The mathematics provided above can be programmed into a computer that is part of a mass spectrometer or in communication with, but not physically part of, said mass spectrometer. Such programming can use any programming computer language, for example, R, Python, and C++. Typically, such programming involves programmed the details provided above into a computer correction module that is placed in said mass spectrometer's computer. Typically, said correction module comprises an input/output controller, a random access memory unit, a hard drive memory unit, and a unifying computer bus system, said input/output controller being configured to receive a digital signal and transmit said signal to said central processing unit and retrieve a signal comprising the accurate measurand from said central processing unit.

EXAMPLES

The following example illustrates particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1: Identifying a False Positive

As an example, calibration compounds were analyzed by a mass spectrometer, providing a list of these compounds and their respective retention times (RTs). The software then scrapes the internet for each compound's boiling point (BP) and generates a cubic linear regression curve for these data. For this example, the equation for this curve could be $y=10.89+24.38x+1.46x^2-1.24x^3$. The mass spectrometry software could tentatively identify a compound with a retention time of 9.66 as bromodichloromethane with a library match probability of 60%. For this example, bromodichloromethane was only found in one of three replicate samples. The BP of bromodichloromethane is 87.22. Using the example curve equation above, the predicted RT would be 8.67. The software would then calculate an adjusted z-test statistic, $$\frac{\left(\frac{|p-o|}{\sqrt{\frac{\sum (p_i-o_i)^2}{n-k}}}\right)}{1.75},$$

wherein k=number of model parameters=3 n=number of data points=46 p=predicted retention time=8.67 o=observed retention time=9.66 i=ith compound $$\Sigma(p_i-o_i)^2=\text{Sum Squared Error}=14.35$$

This adjust z-test statistic is then used to calculate the p-value based on the two-tailed z-test statistic on a normal curve, which is then multiplied by 100 to provide a score on a 0-100 scale. Bromodichloromethane would receive a low Boiling Point Score ($Score_{BP}$) of 34.97. The Library Matching Score ($Score_{LIB}$) is calculated by multiplying the provided library match probability by 0.5. Bromodichloromethane would receive a $Score_{LIB}$ of 30. The Replicates Score ($Score_{REP}$) would be calculated by multiplying the portion of sample containing the TIC (⅓) by 0.5. In this example, bromodichloromethane would receive a $Score_{REP}$ of 16.67. Adding these three scores together yields a Total Score ($Score_{TOTAL}$) of 81.64 out of a possible 200 points. Assuming the user's predetermined valid value limit was set at 100 points, this compound would be considered a false positive.

Example 2: Identifying a True Positive

As an example, calibration compounds were analyzed by a mass spectrometer, providing a list of these compounds and their respective retention times (RTs). The software then scrapes the internet for each compound's boiling point (BP) and generates a cubic linear regression curve for these data. For this example, the equation for this curve could be $y=10.89+24.38x+1.46x^2-1.24x^3$. The mass spectrometry software could tentatively identify a compound with a retention time of 7.40 as ethyl acetate with a library match probability of 90%. For this example, ethyl acetate was found in all three replicate samples. The BP of ethyl acetate is 77.22. Using the example curve equation above, the predicted RT would be 7.99. Using the equations in Example 1, the $Score_{BP}$ would be 58.35, the $Score_{LIB}$ would be 45, and the $Score_{REP}$ would be 50 for a $Score_{TOTAL}$ of 153.35 out of a possible 200 points. Assuming the user's predetermined valid value limit was set at 100 points, this compound would be considered a true positive.

What is claimed is:

1. A method of determining the accuracy of an initial chemical identification obtained from mass spectral matching software:

a) determine a retention time for each of 10 or more known chemicals, or determine a retention time for each of 68 or more known chemicals, each known chemical having an individual Chemical Abstracts Service (CAS) number (No.) and boiling point, using a mass spectrometer comprising mass spectral matching software, wherein the mass spectrometer and/or the mass spectral matching software sends an electronic signal indicating the determined retention time, the individual CAS No., and the boiling point for each of the known chemicals to an input/output controller, wherein the input output controller is configured to receive electronic signals from the mass spectrometer and/or the spectral matching software, to transmit electronic signals to one or more processing units, and to retrieve electronic signals from said one or more processing units;

b) determine an actual retention time, a library match probability and a fragment pattern for each of one or more unidentified chemicals using the mass spectrometer used to determine the retention times of said one or more of known chemicals and determine one or more initial identifications for each of said one or more unidentified chemicals from said fragment patterns using said mass spectral matching software, wherein the mass spectrometer and/or the mass spectral matching software sends an electronic signal indicating the one or more identifications for each of the unidentified chemicals to the input/output controller;

c) assign each of said one or more unidentified chemicals an individual CAS No. and boiling point based on each of said one or more unidentified chemicals initial identifications, wherein said one or more processing units is configured receive electronic signals indicating the initial identifications from input/output controller and assign the individual CAS No. and the boiling point to each of said one or more unidentified chemicals based on the initial identifications;

d) using a cubic linear regression model, derive, using the one or more processing units, the line of best fit from the boiling point and retention time pairs of said known chemicals wherein each x value of a pair is the boiling point and each y value is the retention time and then generate, using the one or more processing units, a cubic linear regression curve for said known chemicals, wherein said one or more processing units is configured to derive said line of best fit and to generate said cubic linear regression curve;

e) generate, using said one or more processing units, an equation corresponding to said cubic linear regression curve, wherein said one or more processing units is configured to generate an equation corresponding to said cubic linear regression curve;

f) determine, using said one or more processing units, an extrapolated retention time for each unknown chemical by inserting, using said one or more processing units, each unknown chemical's boiling point into said equation, wherein said one or more processing units is configured to determine the extrapolated retention time for each unknown chemical by inserting each unknown chemical's boiling point into said equation;

g) generate, using said one or more processing units, a boiling point score by:

(i) comparing the extrapolated retention time for each unknown chemical with the actual retention time obtained for each unknown chemical, said comparison comprising calculating, using said one or more processing units, an adjusted z-test statistic for each unknown chemical;

(ii) calculating, using said one or more processing units, a p-value for each unknown chemical using a two-tailed z test statistic on a normal curve; and (iii) then multiplying, using said one or more processing units, each said p-value by 100 to generate said boiling point score for each unknown chemical on a 0-100 scale;

h) generating, using said one or more processing units, a final library matching score for each unknown chemical by multiplying, using said one or more processing units, each library match probability by 0.5;

i) generating, using said one or more processing units, a Total Score for each unknown chemical by adding together, using said one or more processing units, said unknown chemical's Boiling Point Score and Final Library Matching Score; and j) optionally, rejecting, using said one or more processing units, the initial chemical identification of each unknown chemical having a Total Score of less than 75 and/or accepting, using said one or more processing units, the initial chemical identification of each unknown chemical having a Total Score of 75 or greater.

2. The method of claim 1 wherein said known chemicals are selected from the group consisting of chromatographically compatible chemicals.

3. A computer module programmed with the method of claim 2.

4. The computer module of claim 3, said computer module comprising said input/output controller, a random access memory unit, a hard drive memory unit, and a unifying computer bus system, said input/output controller being configured to receive a digital signal and transmit said signal to said one or more processing units and retrieve a signal comprising the accurate measurand from said one or more processing units.

5. A mass spectrometer comprising a correction module according to claim 3, in one aspect, said computer module comprises said input/output controller, a random access memory unit, a hard drive memory unit, and a unifying computer bus system, said input/output controller being configured to receive a digital signal and transmit said signal to said one or more processing units and retrieve a signal comprising the accurate measurand from said one or more processing units.

6. A mass spectrometer system comprising a mass spectrometer and a computer, said computer comprising a computer module according to claim 3, said computer not physically part of said mass spectrometer but being in communication with said mass spectrometer, in one aspect, said computer module comprises said input/output controller, a random access memory unit, a hard drive memory unit, and a unifying computer bus system, said input/output controller being configured to receive a digital signal and transmit said signal to said one or more processing units and retrieve a signal comprising the accurate measurand from said one or more processing units.

7. A mass spectrometer system comprising a mass spectrometer and a computer, said computer comprising a computer module according to claim 3, said computer being physically part of said mass spectrometer and being in communication with said mass spectrometer, in one aspect, said computer module comprises said input/output controller, a random access memory unit, a hard drive memory unit, and a unifying computer bus system, said input/output controller being configured to receive a digital signal and transmit said signal to said one or more processing units and retrieve a signal comprising the accurate measurand from said one or more processing units.

8. The method of claim 1 wherein said known chemicals are selected from the group consisting of Dichlorodifluoromethane; Chloromethane; 1,2 dichlorotetrafluoroethane; Vinyl chloride; 1,3-Butadiene; Bromomethane; Chloroethane; Trichlorofluoromethane; Acetone; 2-propanol; 1,1-Dichloroethene; Acrylonitrile; 1,1,2-trichloro-1,2,2-trifluoroethane; Methylene Chloride; Carbon disulfide; trans-1,2-Dichloroethene; Methyl tert butyl ether; 1,1-Dichloroethane; Vinyl acetate; 2-Butanone; Hexane; Bromochloromethane; Tetrahydrofuran; cis-1,2-Dichloroethene; 2,2-Dichloropropane; Chloroform; 1,1,1-Trichloroethane; 1,2-Dichloroethane; 1,1-Dichloropropene; Cyclohexane; Benzene; Carbon tetrachloride; 2,2,4-Trimethylpentane; n-Heptane; 1,2-Dichloropropane; 1,4 Dioxane; Trichloroethene; Bromodichloromethane; Methyl-2-pentanone; cis-1,3-Dichloropropene; Toluene; trans-1,3-Dichloropropene; 1,1,2-Trichloroethane; 2-Hexanone; 1,3-Dichloropropane; Dibromochloromethane; 1,2-Dibromoethane; Tetrachloroethene; Chlorobenzene; Ethylbenzene; m,p-Xylene; Styrene; Bromoform; o-Xylene; 1,1,2,2-Tetrachloroethane; 1,2,3-Trichloropropane; n-Propyl benzene; Isopropyl benzene; 4-Ethyltoluene; 1,3,5-Trimethylbenzene; 1,2,4-Trimethylbenzene; 1,3-Dichlorobenzene; Benzyl chloride; 1,4-Dichlorobenzene; 1,2-Dichlorobenzene; 1,2,4-Trichlorobenzene; Hexachlorobutadiene; 1,1-Difluoroethane, Acenaphthene; Acenaphthylene; Anthracene; Azobenzene; Benz[a]anthracene; Benzo[b]fluoranthene; Benzo[k-]fluoranthene; Benzo [ghi]perylene; Benzo[a]pyrene; Benzyl butyl phthalate; Bis (2-chloroethoxy) methane; Bis(2-chloroethyl) ether; Bis(2-ethylhexyl) phthalate; 4Bromodiphenyl ether; Carbazole, 4-Chloroaniline; 4-Chlorodiphenyl ether; Bis-(2-chloroisopropyl) ether; 4-Chloro-3-methylphenol; 2-Chloronaphthalene; 2-Chlorophenol; Chrysene, p-Cresol; Dibenz[a,h]anthracene; Dibenzofuran; Dibutyl phthalate; 1,2 Dichlorobenzene; 1,3-Dichlorobenzene; 1,4-Dichlorobenzene; 2,4-Dichlorophenol; Diethyl phthalate; 2,4-Dimethylphenol; Dimethyl phthalate; 2,4-Dinitrophenol; 2,4-Dinitrotoluene; 2,6-Dinitrotoluene; Di-n-octyl phthalate; Fluoranthene; Fluorene; Hexachlorobenzene; Hexachloro-1,3-butadiene; Hexachlorocyclopentadiene; Hexachloroethane; Indeno[1,2,3-cd]pyrene; Isophorone; 2-Methyl-4,6-dinitrophenol; 2-Methylnaphthalene; o-Cresol, Naphthalene; 2-Nitroaniline; 3-Nitroaniline; 4-Nitroaniline; Nitrobenzene; 2 Nitrophenol, 4-Nitrophenol; N-Nitrosodimethylamine; N-Nitrosodi-n-propylamine; Pentachlorophenol; Phenanthrene; Phenol; Pyrene; 1,2,4-Trichlorobenzene; 2,4,5-Trichlorophenol; 2,4,6-Trichlorophenol and mixtures thereof.

9. The method of claim 1 wherein said known chemicals are selected from the group consisting of Bromomethane; Chloroethane; Acetone; 2-propanol; 1,1-Dichloroethene; Acrylonitrile; Methylene Chloride; Carbon disulfide; trans-1,2-Dichloroethene; Methyl tert butyl ether; 1,1-Dichloroethane; Vinyl acetate; 2-Butanone; Bromochloromethane; Tetrahydrofuran; cis-1,2-Dichloroethene; Chloroform; 1,1,1-Trichloroethane; 1,2-Dichloroethane; 1,1-Dichloropropene; Benzene; Carbon tetrachloride; 2,2,4-Trimethylpentane; 1,2-Dichloropropane; 1,4 Dioxane; Trichloroethene; Bromodichloromethane; Methyl-2-pentanone; cis-1,3-Dichloropropene; Toluene; trans-1,3-Dichloropropene; 1,1,2-Trichloroethane; 2-Hexanone; 1,3-Dichloropropane; Dibromochloromethane; 1,2-Dibromoethane; Tetrachloroethene; Chlorobenzene; Ethylbenzene; m,p-Xylene; Bromoform; o-Xylene; 1,1,2,2-Tetrachloroethane; 1,2,3-Trichloropropane; n-Propyl benzene; Isopropyl benzene; 4-Ethyltoluene; 1,3,5-Trimethylbenzene; 1,2,4-Trimethylbenzene; 1,3-Dichlorobenzene; 1,4-Dichlorobenzene; 1,2-Dichlorobenzene; 1,2,4-Trichlorobenzene; Hexachlorobutadiene and mixtures thereof.

10. The method of claim 1 comprising:

a) running one or more replicates for each unknown chemical and generating, using said one or more processing units, a Final Replicates Score for each unknown chemical, said Final Replicates Score generation for each unknown chemical comprising:
   (i) running one or more replicates of each sample comprising said one or more unknown chemicals;
   (ii) determining, using said one or more processing units, for each unknown chemical, a number of times each unknown chemical is initially identified based on the total number of said replicates; and
   (iii) dividing, using said one or more processing units, the number of times each unknown chemical is initially identified based on the total number of said replicates by the total number of replicates to obtain an Initial Replicates Score for each unknown chemical; and
   (iv) multiplying, using said one or more processing units, each unknown chemical's Initial Replicates Score by 50 to obtain a Final Replicates Score for each unknown chemical;

b) generating, using said one or more processing units, a Total Score for each unknown chemical by adding together said unknown chemical's Boiling Point Score, Final Library Matching Score and Final Replicates Score; and c) optionally, rejecting, using said one or more processing units, the initial chemical identification of each unknown chemical having a Total Score of less than 100 and/or accepting, using said one or more processing units, the initial chemical identification of each unknown chemical having a Total Score of 100 or greater.

11. The method of claim 1 wherein said mass spectral matching software is NIST mass spectral matching software, and/or AMDIS mass spectral matching software.

12. A computer module programmed with the method of claim 1.

13. The computer module of claim 12, said computer module comprising said input/output controller, a random access memory unit, a hard drive memory unit, and a unifying computer bus system, said input/output controller being configured to receive a digital signal and transmit said signal to said one or more processing units and retrieve a signal comprising the accurate measurand from said one or more processing units.

14. A mass spectrometer comprising a computer module according to claim 7, in one aspect, said computer module comprises said input/output controller, a random access memory unit, a hard drive memory unit, and a unifying computer bus system, said input/output controller being configured to receive a digital signal and transmit said signal to said one or more processing units and retrieve a signal comprising the accurate measurand from said one or more processing units.

15. A mass spectrometer system comprising a mass spectrometer and a computer, said computer comprising a computer module according to claim 12, said computer not physically part of said mass spectrometer but being in communication with said mass spectrometer, in one aspect, said computer module comprises said input/output controller, a random access memory unit, a hard drive memory unit, and a unifying computer bus system, said input/output controller being configured to receive a digital signal and transmit said signal to said one or more processing units and retrieve a signal comprising the accurate measurand from said one or more processing units.

16. A mass spectrometer system comprising a mass spectrometer and a computer, said computer comprising a computer module according to claim 12, said computer being physically part of said mass spectrometer and being in communication with said mass spectrometer, in one aspect, said computer module comprises said input/output controller, a random access memory unit, a hard drive memory unit, and a unifying computer bus system, said input/output controller being configured to receive a digital signal and transmit said signal to said one or more processing units and retrieve a signal comprising the accurate measurand from said one or more processing units.

* * * * *